United States Patent
Zhang et al.

(10) Patent No.: US 8,886,139 B2
(45) Date of Patent: Nov. 11, 2014

(54) BEAMFORMING BY SECTOR SWEEPING

(71) Applicant: Marvell World Trade Ltd., St. Michael (BB)

(72) Inventors: Hongyuan Zhang, Fremont, CA (US); Manyuan Shen, Milpitas, CA (US); Songping Wu, Cupertino, CA (US); Hui-Ling Lou, Sunnyvale, CA (US); Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/222,569

(22) Filed: Mar. 21, 2014

(65) Prior Publication Data

US 2014/0206304 A1    Jul. 24, 2014

Related U.S. Application Data

(63) Continuation of application No. 12/548,393, filed on Aug. 26, 2009, now Pat. No. 8,706,039.

(60) Provisional application No. 61/091,914, filed on Aug. 26, 2008.

(51) Int. Cl.
*H04B 1/04* (2006.01)

(52) U.S. Cl.
CPC ........................................ *H04B 1/04* (2013.01)
USPC ........................................ 455/125; 455/63.1

(58) Field of Classification Search
USPC ........................................................ 455/63.1
See application file for complete search history.

(56) References Cited

U.S. PATENT DOCUMENTS

| | | | |
|---|---|---|---|
| 6,233,466 B1 | 5/2001 | Wong et al. | |
| 7,627,348 B2 | 12/2009 | Lysejko et al. | |
| 2007/0099571 A1 | 5/2007 | Withers, Jr. et al. | |
| 2009/0232245 A1 | 9/2009 | Lakkis | |
| 2010/0103045 A1 | 4/2010 | Liu et al. | |
| 2010/0164802 A1 | 7/2010 | Li et al. | |
| 2010/0164805 A1 | 7/2010 | Niu et al. | |

FOREIGN PATENT DOCUMENTS

| | | |
|---|---|---|
| JP | 2008-512955 A | 4/2008 |
| WO | WO-99/65160 A1 | 12/1999 |
| WO | WO-2006/031499 A2 | 3/2006 |

OTHER PUBLICATIONS

Myung-Hoon Yeon, et al., "Enhanced adaptive antenna algorithms for asynchronous TDMA systems", 42nd Annual Conference on Information Sciences and Systems (CISS 2008), Institute of Electrical and Electronics Engineers, Mar. 19-21, 2008.
Partial International Search report for International Application No. PCT/US2009/055071, dated Dec. 3, 2009.

(Continued)

*Primary Examiner* — David Bilodeau

(57) ABSTRACT

A first plurality of training data units are transmitted via a plurality of antennas of a first station as part of a first transmit beamforming training procedure. Subsequently, a second plurality of training data units are received via the plurality of antennas as part of second transmit beamforming procedure while the first station applies a single receive antenna configuration. The second plurality of training data units includes an information element that specifies a feedback from a second station, the feedback including an identifier corresponding to one of the training data units in the first plurality of data units. The first station transmits a feedback message to the second station, that includes (i) one or more indicators of one or more training data units selected from the second plurality of training data units, and (ii) a request to perform a subsequent beamforming training procedure.

20 Claims, 6 Drawing Sheets

(56) References Cited

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"IEEE Std. 802.11n™ IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

Notice of Reasons for Rejection for Japanese Application No. 2011-525174 mailed Jul. 3, 2012.

Office Action in European Application No. 09 791 954.2, dated Oct. 18, 2012.

Summary of Notice of Reasons for Rejection in Japanese Application No. 2011-525174, dated Feb. 12, 2013.

Office Action in Chinese Application No. 200980133117.4, dated Apr. 1, 2013.

van Nee, et al. "The 802.11n MIMO-OFDM Standard for Wireless LAN and Beyond," Wireless Personal Communications, vol. 37, pp. 445-453 (Jun. 2006).

Zhang et al., "Applying Antenna Selection in WLANs for Achieving Broadband Multimedia Communications," IEEE Trans. on Broadcasting, vol. 52, No. 4, Dec. 2006.

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specifica requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

Office Action in European Application No. 09 791 954.2, dated Sep. 25, 2013.

International Preliminary Report on Patentability in corresponding PCT/US2009/055071 dated Mar. 1, 2011.

"IEEE 802.15.3™ Guide Addresses Untapped High-Rate Wireless Personal Area Network (WPAN) Market," The Institute of Electrical and Electronics Engineers, Inc., available at http://standards.ieee.org/announcements/pr_802153wpanguide.html (2004).

International Standard, ISO/IEC 8802-11, ANSI/IEEE Std 802.11, "Information technology—Telecommunications and information exchange between systems—local and metropolitan area networkd—specific requirements" Part 11: Wireless LAN Medium Access Control (MAC) and Physical Layer (PHY) specifications, The Institute of Electrical and Electronics Engineers, Inc., (1999).

Abstract of Wylie-Green, et al., "Multi-band OFDM UWB solution for IEEE 802.15.3a WPANs," 2005 IEEE/Sarnoff Symposium on Advances in Wired and Wireless Communication, pp. 102-105, (2005).

Third Office Action for Chinese Application No. 200980133117.4, mailed on Jun. 3, 2014.

BEAMFORMING BY SECTOR SWEEPING

CROSS REFERENCE TO RELATED APPLICATION

This application is a continuation of U.S. patent application Ser. No. 12/548,393, now U.S. Pat. No. 8,706,039, entitled "Beamforming by Sector Sweeping," filed Aug. 26, 2009, which claims the benefit of U.S. Provisional Patent App. No. 61/091,914, entitled "Beamforming by Sector Sweeping," filed Aug. 26, 2008. The disclosures of both of the applications referenced above are hereby expressly incorporated herein by reference in their entireties.

FIELD OF TECHNOLOGY

The present disclosure relates generally to communication systems in which devices transmit and receive data using multiple antennas and, more particularly, to beamforming by sector sweeping in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, as well as the IEEE Standards 802.15.3 and 802.15.3a, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, antennas and, accordingly, associated effective wireless channels are highly directional at frequencies near or above 60 GHz. When multiple antennas are available at a transmitter, a receiver, or both, it is therefore important to apply efficient beam patterns to the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

SUMMARY

In one embodiment, a method for beamforming in a communication system includes transmitting, with a first station, a first plurality of training data units via a first plurality of antennas to a second station having a second plurality of antennas, wherein the first plurality of training data units are transmitted while the second station operates the second plurality of antennas in an omni receive pattern mode, and each training data unit in the first plurality of training data units includes a corresponding first identifier. The method also includes applying, at the first station, a different transmit steering vector as each training data unit in the first plurality of training data units is transmitted; after transmitting the first plurality of training data units, receiving, at the first station, a second plurality of training data units via the first plurality of antennas, the second plurality of training data units having been transmitted by the second station while the second station applies a different transmit steering vector to the second plurality of antennas as each training unit in the second plurality of training data units is transmitted, wherein the second plurality of training data units includes an information element that specifies a feedback from the second station, the feedback including one identifier corresponding to one of the training data units in the first plurality of data units; applying, at the first station, a single receive antenna configuration as all of the training data units in the second plurality of training data units are received; generating, at the first station, a first plurality of quality indicators based on the second plurality of received training data units, wherein each of the first plurality of quality indicators corresponds to a respective one of the second plurality of training data units; selecting, at the first station, one or more training data units from the second plurality of training data units based on the first plurality of quality indicators; and transmitting, from the first station to the second station, a feedback message including (i) one or more indicators of the one or more training data units selected from the second plurality of training data units, and (ii) a request to perform a subsequent beamforming training procedure to select a receive steering vector.

In another embodiment, an apparatus corresponding to a first station comprises a beamforming network configured to be coupled to a first plurality of antennas, and a beamforming controller configured to control the beamforming network to: (i) apply a different transmit steering vector as each training data unit in a first plurality of training data units is transmitted to a second station having a second plurality of antennas while the second station operates the second plurality of antennas in an omni receive pattern mode, wherein each training data unit in the first plurality of training data units includes a corresponding first identifier, and (ii) apply a single receive antenna configuration as all of the training data units in a second plurality of training data units are received via the first plurality of antennas after transmitting the first plurality of training data units, the second plurality of training data units having been transmitted by the second station while the second station applies a different transmit steering vector to the second plurality of antennas as each training unit in the second plurality of training data units is transmitted, wherein the second plurality of training data units includes an information element that specifies a feedback from the second station, the feedback including one identifier corresponding to one of the training data units in the first plurality of data units. The apparatus also comprises a quality assessment unit configured to generate a first plurality of quality indicators based on the second plurality of received training data units, wherein each of the first plurality of quality indicators corresponds to a respective one of the second plurality of training data units, and a steering vector selection unit configured to select one or more training data units from the second plurality of training data units based on the first plurality of quality indicators, wherein the apparatus is configured to cause the first station to transmit a feedback message including (i) one or more indicators of the one or more training data units selected from the second plurality of training data units, and (ii) a request to perform a subsequent beamforming training procedure to select a receive steering vector.

In yet another embodiment, a method for beamforming in a communication system includes receiving, at a first station, a first plurality of training data units via a first plurality of antennas, wherein the first plurality of training data units have been transmitted by a second station while the second station applies a different transmit steering vector as each training data unit in the first plurality of training data units is transmitted, and each training data unit in the first plurality of training data units includes a corresponding first identifier. The method also includes applying, at the first station, an omni receive pattern mode as all of the training data units in the first plurality of training data units are received; generating, at the first station, a first plurality of quality indicators based on the first plurality of received training data units, wherein each of the first plurality of quality indicators corresponds to a respective one of the first plurality of training data units; selecting, at the first station, one or more training data units from the first plurality of training data units based on the first plurality of quality indicators; after receiving the first plurality of training data units, transmitting, from the first station, a second plurality of training data units via the first plurality of antennas, wherein the second plurality of training data units includes an information element that indicates the selected one or more training data units from the first plurality of training data units; applying, at the first station, a different transmit steering vector as each training data unit in the second plurality of training data units is transmitted; receiving, at the first station, a feedback message from the second station, the feedback message including (i) one or more indicators of the one or more training data units selected from the second plurality of training data units, and (ii) a request to perform a subsequent beamforming training procedure to select a receive steering vector for the second station; and selecting, at the first station, a transmit steering vector based on the feedback message.

In still another embodiment, an apparatus corresponding to a first station comprises a beamforming network configured to be coupled to a first plurality of antennas, and a beamforming controller configured to control the beamforming network to: (i) apply an omni receive pattern mode as all of the training data units in the first plurality of training data units are received via the first plurality of antennas, wherein the first plurality of training data units have been transmitted by a second station while the second station applies a different transmit steering vector as each training data unit in the first plurality of training data units is transmitted, and each training data unit in the first plurality of training data units includes a corresponding first identifier, and (ii) apply a different transmit steering vector as each training data unit in a second plurality of training data units is transmitted via the first plurality of antennas, wherein the second plurality of training data units are transmitted after receiving the first plurality of training data units. The apparatus also comprises a quality assessment unit configured to for generate a first plurality of quality indicators based on the first plurality of received training data units, wherein each of the first plurality of quality indicators corresponds to a respective one of the first plurality of training data units; and a steering vector selection unit configured to: (i) select one or more training data units from the first plurality of training data units based on the first plurality of quality indicators, wherein the second plurality of training data units includes an information element that indicates the selected one or more training data units from the first plurality of training data units, and (ii) select a transmit steering vector based on a feedback message received from the second station, the feedback message including (i) one or more indicators of the one or more training data units selected from the second plurality of training data units, and (ii) a request to perform a subsequent beamforming training procedure to select a receive steering vector for the second station.

DETAILED DESCRIPTION

Figure 1A:
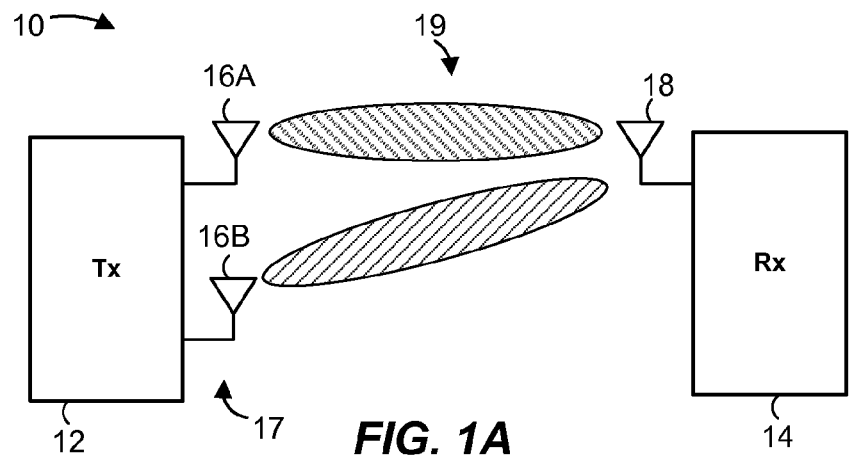
FIG. 1A illustrates a communication system including a transmitter having multiple antennas and a receiver having a single antenna.
Figure 1B:
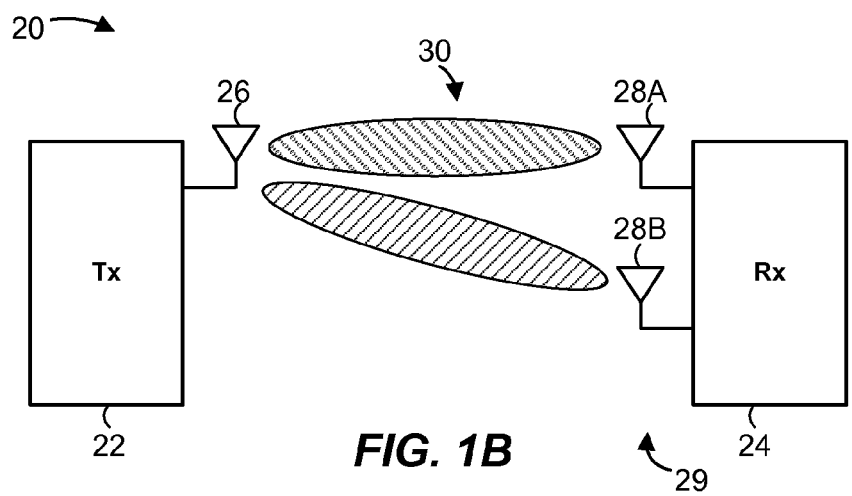
FIG. 1B illustrates a communication system including a transmitter having a single antenna and a receiver having multiple antennas.
Figure 1C:
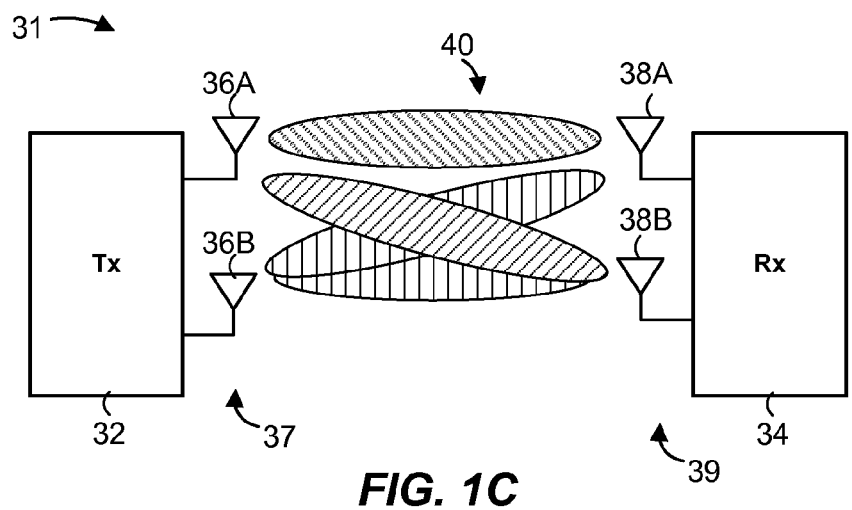
FIG. 1C illustrates a communication system including a transmitter having multiple antennas and a receiver having multiple antennas.

FIGS. 1A-1C are block diagrams illustrating several examples of communication systems that may use sector sweeping discussed herein to identify efficient gain patterns for transmitting and receiving data via wireless channels. In particular, FIG. 1A illustrates a wireless communication system 10 in which a transmitting device 12 transmits information over a wireless communication channel to a receiving device 14. Each of the devices 12 and 14 may be a base station or a mobile station, for example. In the example of FIG. 1A, the transmitting device 12 is equipped with two or more antennas 16 defining an antenna array 17, while the receiving device 14 is equipped with a single antenna 18. The wireless communication system 10 is thus a multiple input, single output (MISO) system. For the purposes of simplicity and conciseness, the transmitting device 12 is illustrated with only two antennas 16A and 16B. However, it will be noted that the transmitting device 12 may generally have any desired number of antennas.

During transmission, the transmitting device 12 may control the phase and/or amplitude of a signal at each of the antennas 16A and 16B to define a radiation or gain pattern 19. Specifically with respect to controlling phases, the transmitting device 12 may select a steering vector (or "phasor") that specifies a set of phase shifting angles, and apply the steering vector to the antenna array 17 to thereby define a phased antenna array. The steering vector may specify a 0° phase shift for the antenna 16A and a 35° phase shift for the antenna 16B, for example. In this manner, the steering vector defines a direction of transmission or reception of the antenna array 17 that may be referred to as "sector."

Similarly, a wireless communication system 20 illustrated in FIG. 1B is a single input, multiple output (SIMO) system that includes a transmitter 22 and a receiver 24, with the transmitter 22 having a single antenna 26 and the receiver 24 having multiple antennas 28 arranged in an antenna array 29. The transmitter 22 may transmit a signal to the receiver 24 via the single antenna 26, and the receiver 24 may define a gain pattern 30 by controlling phase shifting angles at the antennas 28A-28B using a corresponding steering vector.

Meanwhile, a wireless communication system 31 illustrated in FIG. 1C is a multiple input, multiple output (MIMO) system in which each of a transmitter 32 and a receiver 34 is equipped with multiple antennas (36A-36B defining an antenna array 37 and 38A-38C defining an antenna array 39, respectively). Each of the transmitter 32 and the receiver 34 may apply steering vectors to the respective antenna array 37 or 39 to define gain patterns 40.

A station equipped with multiple antennas and operating in a MIMO environment (or in one of degenerate forms of MIMO such as SIMO or MISO) may use a transmit steering vector $u_{TX}$ to define a gain pattern when transmitting outbound data and a receive steering vector $u_{RX}$ to define a gain pattern when receiving inbound data. By extension, when a pair of multi-antenna devices (e.g., devices 32 and 34) exchange data in both directions, these devices may define steering vectors $u_{TX}^1$, $u_{RX}^1$, $u_{TX}^2$, and $u_{RX}^2$. Further, an antenna array may sometimes operate in an omni receive pattern mode or quasi-omni receive pattern mode (i.e., closely approximating the omni mode) $omni_{RX}$ in which the antenna array does not reinforce or suppress power of signals from any particular direction, or in an omni or quasi-omni transmit pattern mode $omni_{TX}$ in which the antenna array does not reinforce or suppress power of transmitted signals in any particular direction. For the purposes of conciseness, both omni and quasi-omni modes are referred to as "omni" modes below.

Figure 2:
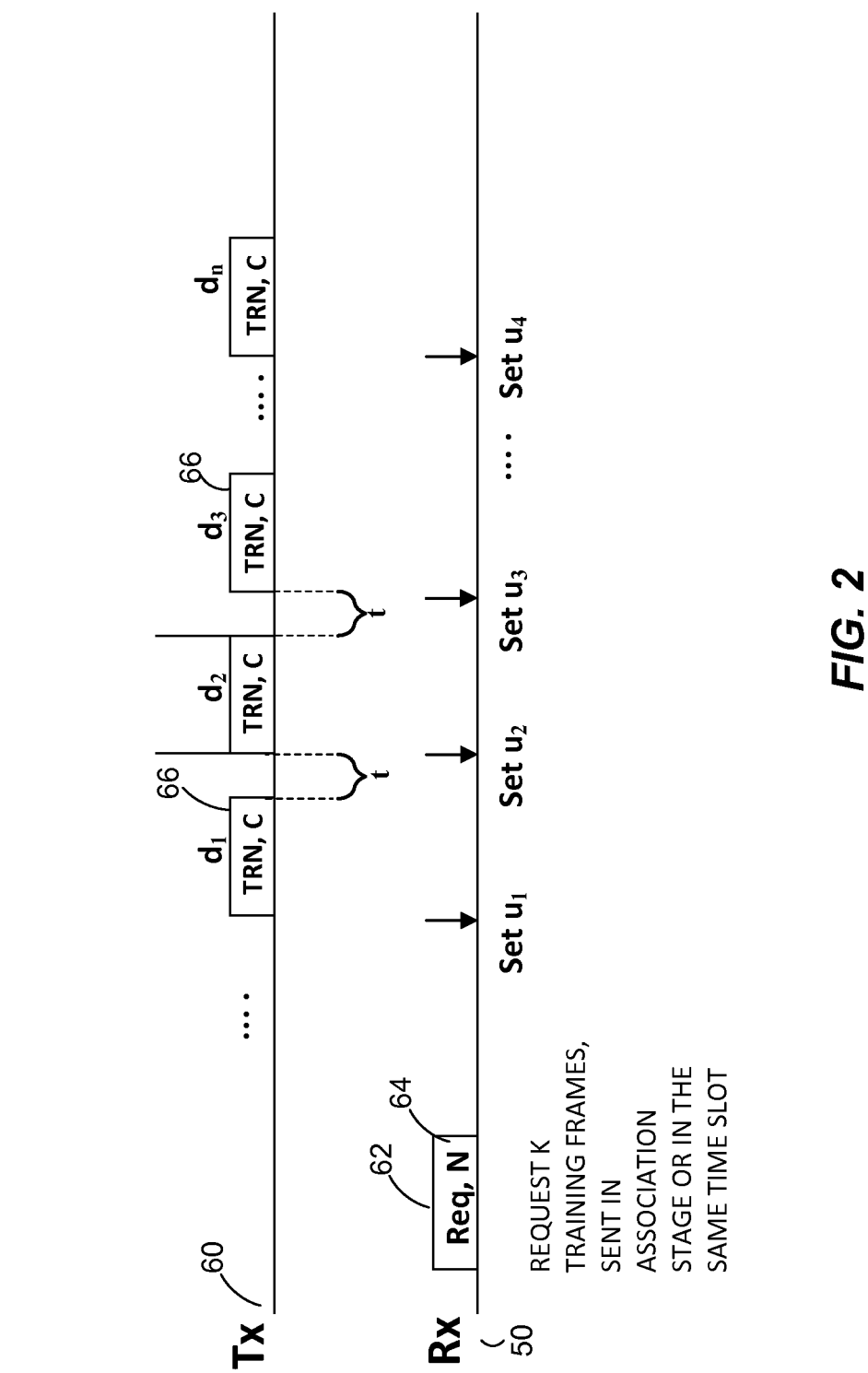
FIG. 2 is a timing diagram that illustrates using receiver sector sweeping to select a receive steering vector.

In general, any pair of communicating stations in which at least one of the stations has multiple antennas can implement beamforming by sector sweeping as discussed herein. One example of beamforming by sector sweeping in connection with a multi-antenna station 50 (Rx) and another station 60 (Tx) will be described with reference to FIG. 2. FIG. 2 is a timing diagram that illustrates data transmitted between the station 50 and the station 60. The station 50 includes two or more antennas, whereas the station 60 may include one or more antennas. To identify an efficient (or, at least, a relatively good) receive steering vector $u_{RX}$, the multi-antenna station 50 may iteratively apply a series of receive steering vectors $u_1, u_2, \ldots u_n$ to the antenna array of the station and receive all or some of training data units (e.g., packets, frames, etc.) $d_1, d_2, \ldots d_n$ at the antenna array for some or all of the receive steering vectors $u_1, u_2, \ldots u_n$. In this sense, each of the receive steering vectors $u_1, u_2, \ldots u_n$ corresponds to one of the training data units $d_1, d_2, \ldots d_n$ (e.g., $u_1$ corresponds to $d_1$, $u_2$ corresponds to $d_2$, etc.), although some of the data units $d_1, d_2, \ldots d_n$ may not always reach the station 50. The station 50 may assess the quality of each received data unit $d_1, d_2, \ldots d_n$, using any desired technique. Preferably, the peer station 60 transmits the training data units $d_1, d_2, \ldots d_n$ using the same transmit steering vector (or an omni or quasi-omni transmit pattern mode, a single antenna, etc.) so as to allow the receiving station 50 to assess the quality of received data units $d_1, d_2, \ldots d_n$ in view of the parameters of only the receiving antenna array. The station 50 may then select a receive steering vector $u_{RX}$ from or based on the set of steering vectors $u_1, u_2, \ldots u_n$ based on the relative quality of received data units. In this manner, the station 50 performs beamforming in the inbound direction (Rx beamforming) by conducting a sector sweep.

In some embodiments, the receive steering vector $u_{RX}$ need not precisely match any of the steering vectors $u_1, u_2, \ldots u_n$, and the station 50 may use the quality metrics associated with the received sequence of data units $d_1, d_2, \ldots d_n$ to extrapolate the desired receive steering vector $u_{RX}$. In other embodiments, the station 50 may average several steering vectors u (e.g., top two, top three, etc.) to determine the receive steering vector $u_{RX}$. In general, it is possible to apply any suitable algorithm to generate the receive steering vector $u_{RX}$ based on the assessed quality of data units corresponding to the set $u_1, u_2, \ldots u_n$ (or a subset thereof).

The station 50 may use any desired technique to assess the quality of a received training data unit d. For example, the station 50 may measure the strength of the received signal, calculate the signal-to-noise ratio (SNR) of the signal associated with the training data unit d, assess the bit error rate (BER) of the data in the data unit d, etc. In general, the beamforming techniques discussed herein may be used with any methodology for measuring the quality of wireless reception.

In some embodiments, the station 60 may transmit the training data units $d_1, d_2, \ldots d_n$ using the most reliable modulation and coding scheme (MCS) set available to the stations 50 and 60. In other words, the station 60 may select the slowest data rate and, in some cases, the longest preamble defined by the wireless standard supported by the stations 50 and 60 (e.g., IEEE Standard 802.15). The stations 50 and 60 may thus increase the probability that the training data unit d successfully propagates from the station 60 to the station 50. However, it will be noted that the beamforming techniques discussed herein do not require any particular modulation scheme or coding rate.

With continued reference to FIG. 2, the station 50 may transmit a request message 62 to the station 60 to request that the peer station 60 begin transmitting the series of data units $d_1, d_2, \ldots d_n$. In some embodiments, the request message 62 may include a count 64 that specifies the number N of data units in the sequence $d_1, d_2, \ldots d_n$. In other embodiments, the number N may be specified by the communication protocol shared by the stations 50 and 60, pre-set by a network controller (not shown), negotiated by the stations 50 and 60 during another protocol stage, or otherwise agreed upon by the stations 50 and 60. In yet another embodiment, the peer station 60 may include a countdown identifier 66 (C) in each training unit d in the sequence $d_1, d_2, \ldots d_n$ to indicate how many training data units are scheduled to follow the training data unit d. As another alternative, the station 50 may not know how many data units form the sequence $d_1, d_2, \ldots d_n$, and may stop processing training data units in response to detecting another condition such as, for example, identifying a sufficiently acceptable steering vector u, upon expiration of a timer, after receiving data units via a set number of different steering vectors u, etc.

The station 50 may transmit a request message 62 during the association or beacon stage of a network in which the stations 50 and 60 operate. For example, the stations 50 and 60 may operate in a piconet in which a network controller may schedule timeslots for various stages of network formation as well as a timeslot for beamforming in the Rx and/or Tx directions. In at least some piconet embodiments, the stations 50 and 60 may initiate and/or negotiate a beamforming procedure via the network controller. In particular, the station 50 may send a request to initiate Rx beamforming to the network controller and specify the number of training data units the station 60 should send to the station 50. The request may be scheduled, mandated at a particular stage by the communication protocol, or initiated on an ad hoc basis.

If desired, the stations 50 and 60 may perform Rx beamforming in the same timeslot in which the station 50 sends the request message 62 to the station 60. In the specific context of WPAN, for example, the timeslot during which the request message 62 and Rx and/or Tx beamforming occur may be called a Channel Allocation Timeslot ("CTA"). Alternatively, in response to receiving the request message 62, the network controller may allocate one or several timeslots during which the specified number of training units may be sent, and the network controller may communicate the scheduling information to the stations 50 and 60. Additionally or alternatively, the network controller may schedule Rx and Tx beamforming in one or both directions (i.e., Rx and Tx beamforming at station 50 and Rx and Tx beamforming at station 60).

As illustrated in FIG. 2, the station 50 may initially apply the steering vector $u_1$ to its antenna array prior to receiving the training data unit $d_1$, and switch the steering vector from $u_1$ to $u_2$ at any time after receiving the training data unit $d_1$ but before the expected arrival of the training data unit $d_2$. Preferably, the training data units $d_1, d_2, \ldots d_n$ are equal in length and are separated by a constant interval t so that the station 50 can correctly switch the steering vector u even if one or several training data units d are lost.

In general, a multi-antenna station (e.g., the station 50) may use sector sweeping for beamforming both in the inbound (Rx) and the outbound direction (Tx). In particular, the station may identify an efficient transmit steering vector $u_{TX}$ by transmitting a series of data units $d'_1, d'_2, \ldots d'_n$ to a peer station, for example, while applying different steering vectors $u'_1, u'_2, \ldots u'_n$ to the antenna array of the station for each transmitted data unit. If equipped with multiple antennas, the peer station (e.g., the station 60) preferably applies the same steering vector to the antenna array of the peer station during Tx beamforming by sector sweeping. The peer station may assess the relative quality of each of the data units $d'_1, d'_2, \ldots d'_n$ actually received at the peer station and, upon receiving or failing to receive the last data unit $d'_n$, communicate the identity of the data unit associated with the best quality metric in the received series to the multi-antenna station conducting Tx beamforming. Alternatively, the peer station may communicate the identities of some number of the data units corresponding to the best quality metrics (e.g., top two, top three, etc.). In general, the peer station may apply any suitable selection criterion to the received data units. As yet another alternative, the peer station may communicate to the multi-antenna station the quality metrics of all training data units d' received at the peer station. The multi-antenna station may then select the transmit steering vector $u_{TX}$ in view of the feedback from the peer station.

If desired, the stations 50 and 60 may perform beamforming by combining Rx sector sweeping with Tx sector sweeping in one or both directions. As discussed in greater detail below, a beamforming protocol may mandate Rx sector sweeping after Tx sector sweeping, for example. However, it will be also noted that for some well-calibrated multi-antenna stations 50 and 60, the effective wireless channels H may be reciprocal in forward and reverse directions (i.e., $H_{FW} = H_{RV}^T$), and the transmit and receive properties of the stations 50 and 60 may be symmetrical. In these cases, the stations 50 and 60 may realize bidirectional beamforming using sector sweeping in only one direction. As one example, the station 50 may determine the receive steering vector $u_{RX}$ using the beamforming by sector sweeping as discussed above, and then set its transmit steering vector $u_{TX}$ to $u_{RX}$. As another example, the station 50 may determine the transmit steering vector $u_{TX}$ using the techniques discussed above, and then set its receive steering vector $u_{RX}$ to $u_{TX}$.

Figure 3:
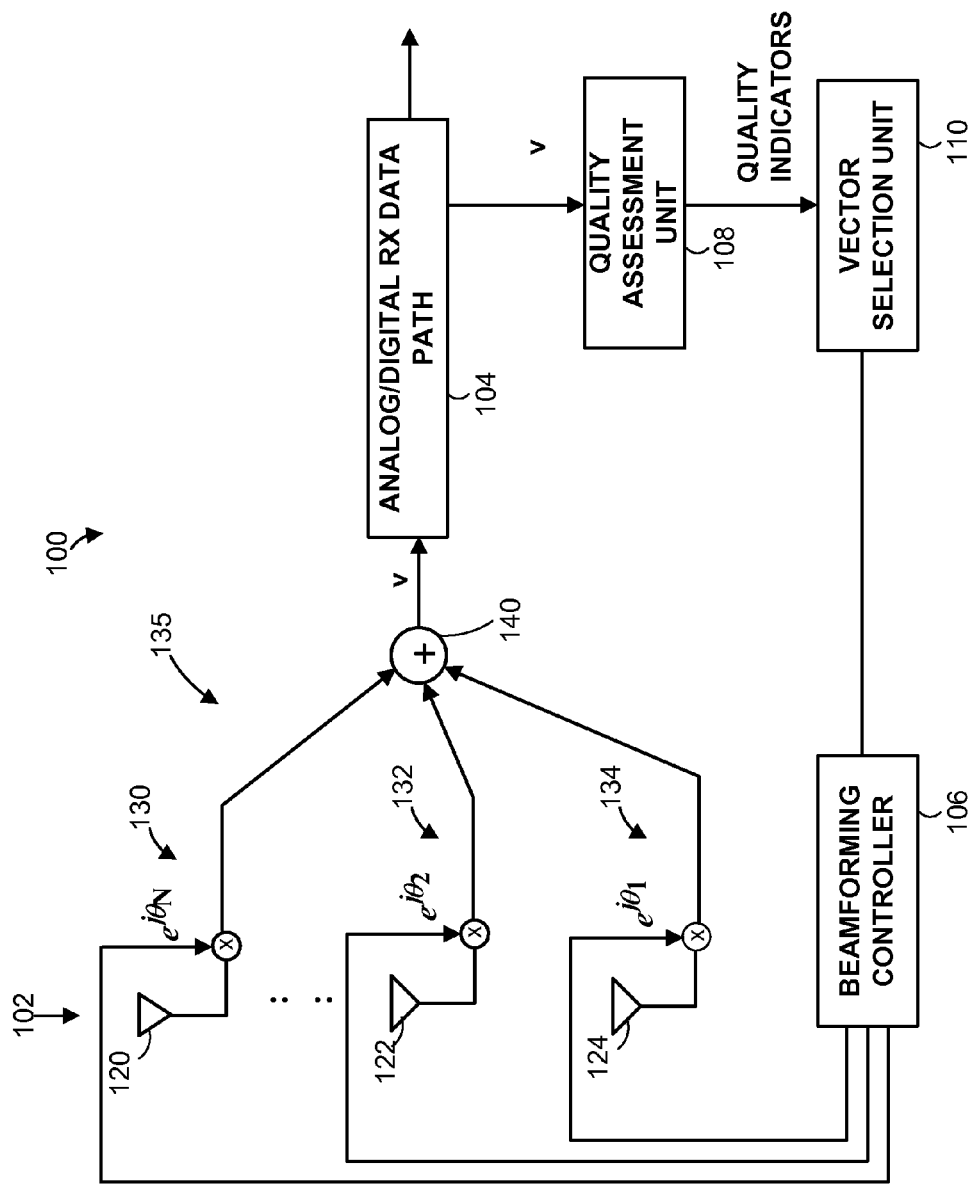
FIG. 3 is a block diagram of an example receiver configured to select a receive steering vector based on sector sweeping.

Next, FIG. 3 illustrates an example receiver architecture of a station 100 that includes an antenna array 102, an analog/digital receiver data path 104, a beamforming controller 106, a quality assessment unit 108, and a vector selection unit 110. The antenna array 102 has n antennas including antennas 120, 122, and 124 coupled to respective delay lines 130, 132, and 134, which may be digitally controllable and which define a beamforming network 135. Each of the delay lines 130, 132, and 134 can shift the signal received from the corresponding antenna 120, 122, or 124 by a phase shifting angle θ. Together, the antenna array 102 and the delay lines 130, 132, and 134 define a phased array of the station 100. During an Rx beamforming procedure, the beamforming controller 106 may iteratively step through a sequence of steering vectors $u_1, u_2, \ldots u_n$ as discussed above with reference to FIG. 2, and apply the phase shifting angles $\theta_1, \theta_2, \ldots \theta_n$ to the digitally controllable delay lines 130, 132, and 134 according to a current value of the vector u. Together, the received and phase-shifted signals define a received signal vector $v = [e^{j\theta_N}, e^{j\theta_{N-1}}, \ldots, e^{j\theta_2}, e^{j\theta_1}]$.

As illustrated in FIG. 3, the antennas 120-124 may share a common analog/digital receive data path to reduce the implementation cost of the station 100. To this end, an adder 140 may use any suitable technique to combine the signals from the antennas 120-124, shifted by the corresponding angles $\theta_1, \theta_2, \ldots \theta_n$, prior to supplying the combined received signal vector v to the shared analog/digital receive data path 104. In other embodiments, each of the antennas 120-124 and the corresponding delay line 130-134 may be coupled to a separate data path. As is generally known, the analog/digital receive data path 104 may include some or all of such components as an equalizer, a decoder, a de-interleaver, a demodulator, an A/D converter, a Fast Fourier Transform (FFT) processing block, etc.

The analog/digital receive data path 104 may additionally supply the combined received signal vector v (optionally processed by one or more of the components in the receive data path 104) to the quality assessment unit 108. As indicated above, the quality assessment unit 108 may use any desired technique to generate a quality indicator or metric for the signal vector v. The quality assessment unit 108 may then supply each calculated quality indicator to the vector selection unit 110. Alternatively, the quality assessment unit 108 may supply only some of the quality indicators (e.g., quality indicators exceeding a certain threshold value) to the vector selection unit 110 which, in turn, may communicate with the beamforming controller 106 to determine which of the steering vectors $u_1, u_2, \ldots u_n$ yielded the one or several selected quality indicators.

Generally with respect to the receiver architecture illustrated in FIG. 3, it will be noted that various ones of the modules 104, 106, 108, 110 may be implemented using hardware, software instructions executed by a processor, firmware, or combinations thereof. Moreover, some of the modules 104, 106, 108, 110 may be custom integrated circuits, application-specific integration circuits (ASICs), etc., communicatively coupled by electrical busses, for example. Further, the delay lines 130-134 may be digitally or analog controllable.

Figure 4:
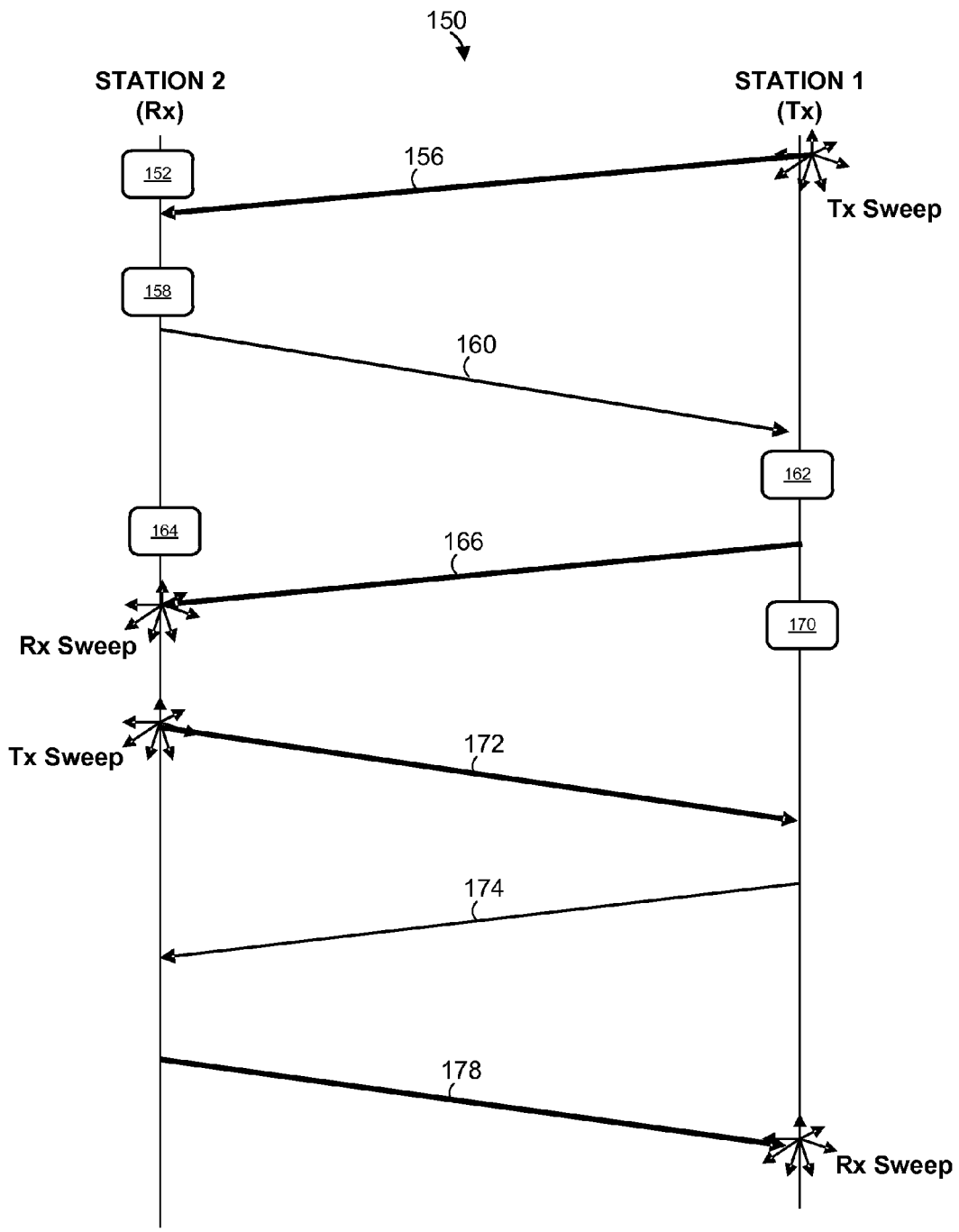
FIG. 4 is a message sequence chart that illustrates an example of information exchanges between stations to implement steering vector selection based on sector sweeping.
Figure 5:
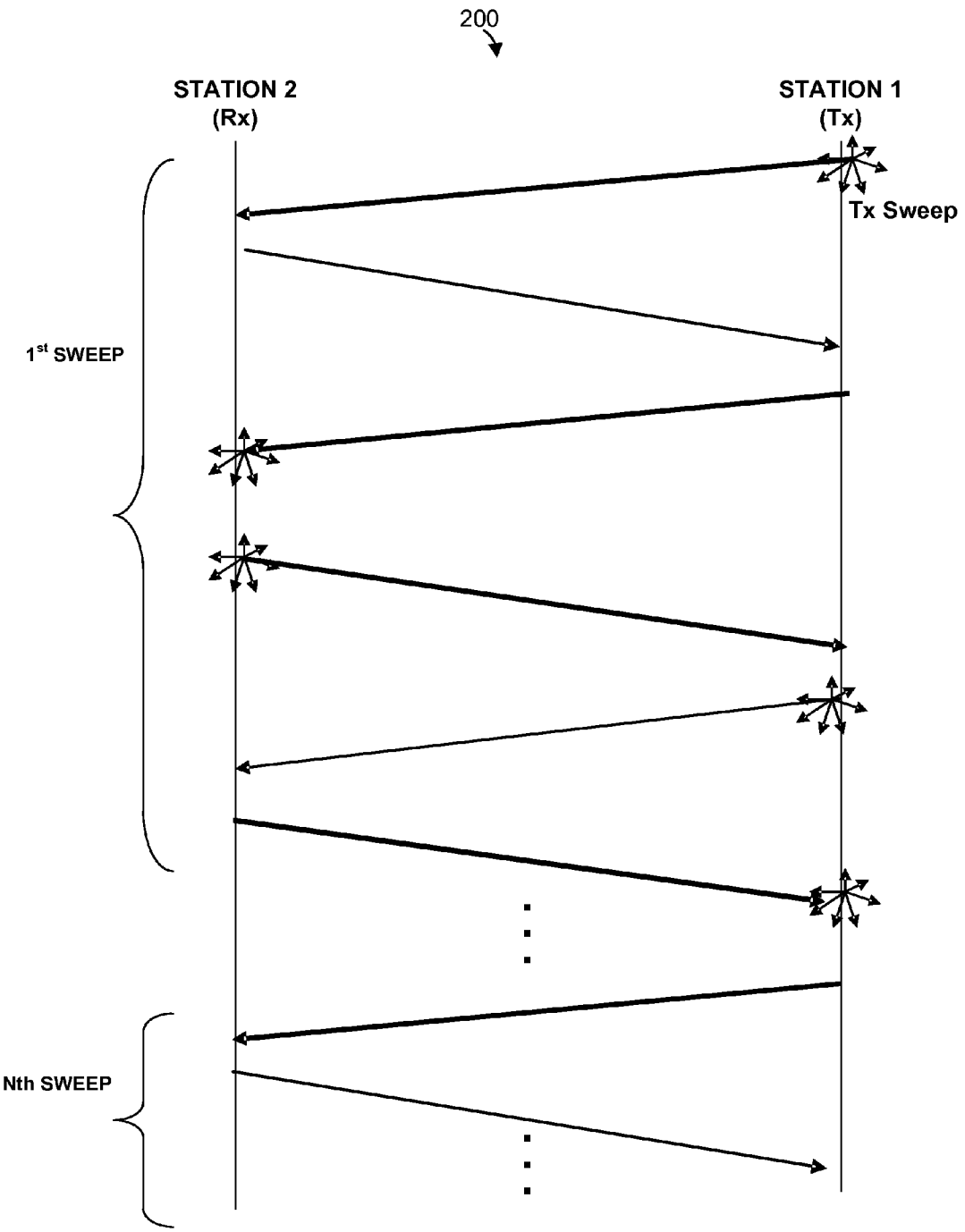
FIGS. 5 and 6 are message sequence charts that illustrate other examples of information exchanges between stations to implement steering vector selection based on sector sweeping.
Figure 6:
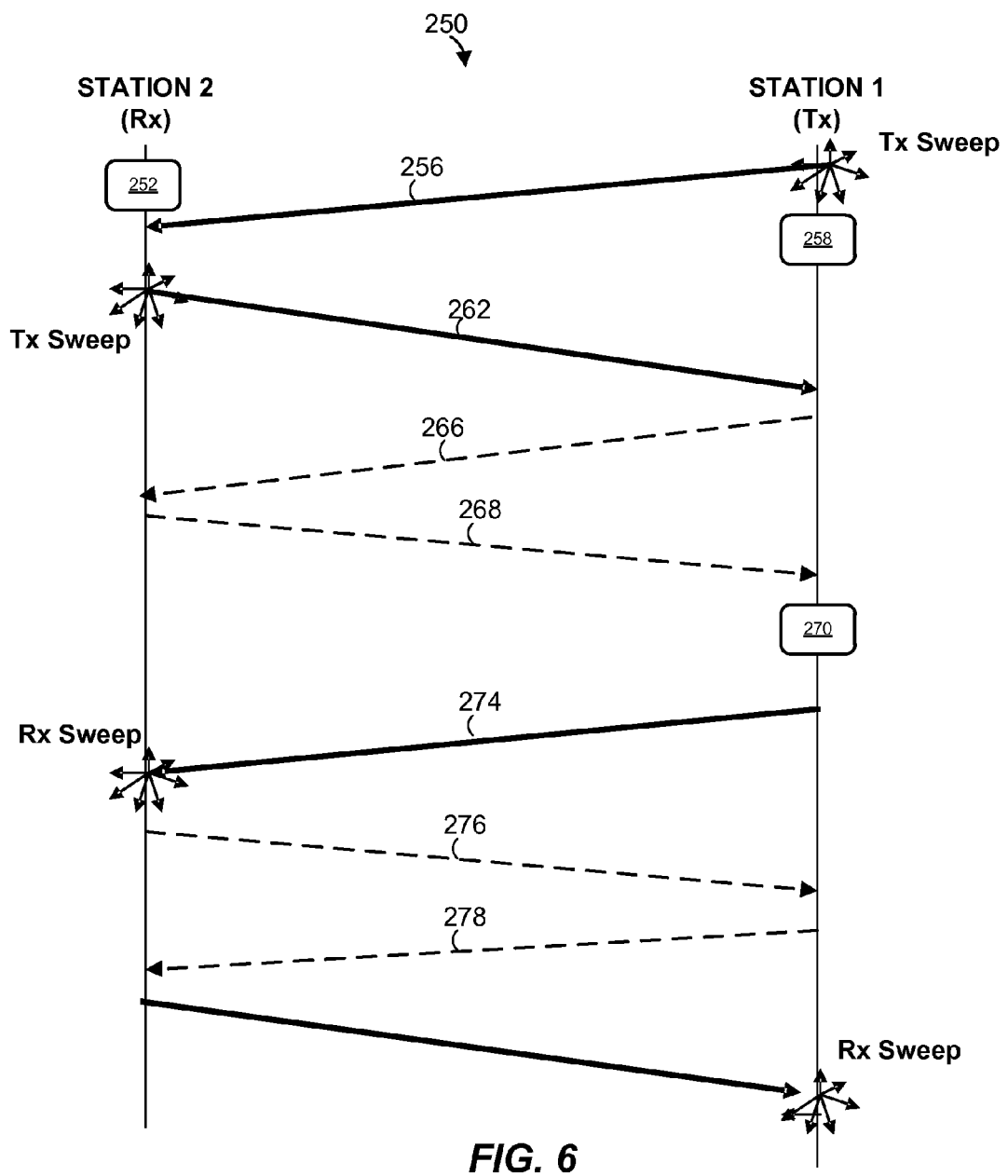

Next, FIGS. 4-6 are message sequence diagrams corresponding to several example methods that a pair of communicating devices (e.g., 12 and 14 of FIG. 1A, 22 and 24 of FIG. 1B, or 32 and 34 of FIG. 1C) may utilize, to support the beamforming techniques discussed above with reference to FIGS. 2 and 3. The methods discussed with reference to FIGS. 4-6 may be implemented as general beamforming protocols for WPAN, WLAN, and other types of networks. In this regard, it will be noted that some of the messages or steps of these methods may be omitted depending on the availability of multiple antennas at each of the pair of communicating devices, desired level of robustness, computational complexity, channel symmetry, etc.

Referring to FIG. 4, a method 150 provides a joint bidirectional Tx and Rx sector sweeping for Tx and Rx beamforming. If implemented by a pair of multi-antenna devices 32 and 34, for example, station 2 with a timeline illustrated on the left may correspond to the device 34, and station 1 with a timeline illustrated on the right may correspond to the device 32. However, it will be understood that the terms "transmitter"/ "transmitting device" and "receiver"/"receiving device" merely refer to operational states of physical devices and are not intended to always limit these devices to only receiving or transmitting in the respective communication network. For example, the device 34 in FIG. 1C may operate as a transmitter and the device 32 may operate as a receiver at some point during operation.

In state 152, station 2 sets its antenna array to an omni receive pattern mode omni$_{RX}$ in preparation for a sector sweeping procedure for Tx beamforming that station 1 initiates to determine the transmit steering vector $u_{TX}^1$. As discussed above, stations 1 and 2 may have negotiated the timeslot for the Tx beamforming procedure in advance or, as another example, a network controller may have allocated one or several timeslots for some or all of the message exchanges of the method 150. Station 1 transmits a sequence 156 of training data units which may be similar to the data units $d_1, d_2, \ldots d_n$ discussed with reference to FIG. 2. The sequence 156 may include data units of equal size spaced apart at equal intervals and having an identifier such as a sequence number, for example. Station 1 utilizes a different steering vector u for transmitting each training data unit in the sequence 156.

Station 2 may receive the entire or partial (e.g., reduced by loss, rejection, etc.) sequence 156 and assess the quality of each data unit in the sequence 156 as discussed above with reference to FIG. 2. In or immediately prior to state 158, station 2 may evaluate the quality of the received data units. Because station 2 receives the sequence 156 using an omni receive pattern, the quality of each received data unit depends primarily on the steering vector u that station 1 used to transmit the data unit. Upon identifying the best received data unit (i.e., the data unit corresponding to the best evaluated quality), station 2 may send a feedback message 160 to station 1 prior to transitioning to state 164. Accordingly, the feedback message 160 may include the identifier included in the best received data unit.

In other embodiments, station 2 may report more than one identifier to station 1 in the message 160. For example, station 2 may report the identifiers of "top three" data units received as a part of the sequence 156, the best and the worst received data units to allow station 1 to assess the spread in transmit quality, identifiers of all received data units along with the corresponding quality metrics, or any other desired report related to the sequence 156.

Optionally, the message 160 may include a request to initiate an Rx sector sweeping procedure at station 2. In the example of FIG. 4, station 2 includes the request along with an informational element (IE) identifying the number of training units $N_2$ to be transmitted to station 2 during the Rx sector sweeping procedure. Upon receiving message 160, station 1 may compare the reported one or several identifiers in the message 160 to the sequence of steering vectors used to transmit the sequence 156 of training data units, and apply any desired selection algorithm to the one or several identifiers to select the transmit steering vector $u_{TX}^1$. As one example, station 1 may simply choose the steering vector used to transmit the identified best training data unit as $u_{TX}^1$.

In or immediately prior to state 162, station 1 may apply the transmit steering vector $u_{TX}^1$ to its antenna array. It will be noted that in state 162, station 1 can already determine which steering vector yields an (at least relatively) efficient gain pattern in transmitting data to station 2. Of course, the channel H may evolve with time and station 1 may need to re-evaluate the transmit steering vector $u_{TX}^1$ at a later time. In this example, however, station 1 may assume that Tx sector sweeping using the sequence 156 provided a transmit steering vector acceptable at least for the duration of the method 150. Station 1 may then proceed to transmit $N_2$ training data units to station 2 (sequence 166), preferably using the steering vector $u_{TX}^1$.

Similar to the Tx sector sweep procedure of station 1, station 2 may receive the entire or partial sequence 166 and assess the quality of each data unit in the sequence 166 using any desired technique. Station 2 may apply a different steering vector u to its antenna array for each training data unit received as part of the sequence 166. Upon receiving the entire sequence 166 (or a local timeout event indicating that station 1 has completed the transmission of the sequence 166), station 2 may select the best one or several steering vectors and determine the receive steering vector $u_{RX}^2$ using the selection. This procedure is similar to the technique discussed above with reference to FIG. 2.

If stations 1 and 2 are well calibrated, exchanging the remaining messages of the method 150 is unnecessary. Instead, station 1 may simply assign the $u_{RX}^1 = u_{TX}^1$, and station 2 may similarly assign $u_{TX}^2 = u_{RX}^2$.

If, however, stations 1 and 2 cannot assume sufficient reciprocity to extrapolate the remaining steering vectors, station 1 may set its antenna array to the omni receive pattern mode omni$_{RX}$ in state 170, and station 2 may transmit a sequence 172 of training data units while switching the steering vector u upon transmitting each training data unit in the sequence 172. Similar to station 1, station 2 may include a sequence number or another type of an identifier in each training data unit so that station 1 may reply with the best one or several identifiers in a message 174. Also similar to the message 160 discussed above, station 1 may transmit a request to initiate an Rx sector sweeping procedure at station 1 as well as the number $N_1$ of training data units to be transmitted to station 1 during the Rx sector sweeping procedure. Upon receiving the message 174, station 2 can identify the transmit steering vector $u_{TX}^2$, apply the transmit steering vector $u_{TX}^2$ to its antenna array, and begin transmitting $N_1$ training data units to station 1 as a sequence 178. Using the techniques discussed above and based on some or all of the $N_1$ training data units, station 1 may then determine the receive steering vector $u_{RX}^1$.

In some embodiments, each procedure for determining a respective vector $u_{RX}^1$, $u_{RX}^2$, $u_{TX}^1$, or $u_{TX}^1$ may occupy a separate timeslot so that the method 150, absent sufficiently good calibration of stations 1 and 2, occupies four timeslots. In other embodiments, the entire bidirectional Tx and Rx sweeping procedure of the method 150 may be implemented in a single timeslot, pre-allocated by a network controller or negotiated by one or both of the stations in real time. Further, it will be noted that some of the messages discussed with reference to FIG. 4 may be separated. For example, stations 1 and 2 may report feedback related to Tx sector sweeping separately from request Rx sector sweeping.

Further with respect to FIG. 4, a pair of devices (e.g., the transmitter 12 and the receiver 14 of FIG. 1A) in which only one of the devices is equipped with multiple antennas may easily bypass some of the stages or steps of the method 150 by controlling parameters in the messages 160 or 174, for example. In particular, to indicate to station 1 that station 2 does not require an Rx sector sweeping procedure (because station 2 has only one antenna), station 2 may set the IE that specifies $N_2$ to zero. Further, station 1 may retain this information for the duration of the method 150 so as to omit both the Rx sector sweeping at station 2 and Tx sector sweeping at station 2 (sequence 172). Of course, stations 1 and 2 may also choose to set $N_1$ or $N_2$ to zero when multiple antennas are available but the sector sweeping procedure is not desired.

FIG. 5 illustrates a method 200 largely similar to the method 150, except that stations 1 and 2 conduct multiple iterations (or "sweeps") of beamforming using sector sweeping when implementing the method 200. Thus, sweep 1 may include the same states and message exchanges as the entire procedure of method 150. However, sweep 1 of the method 200 may include a smaller number of sectors (i.e., vectors u and, correspondingly, training data units d). In this sense, sweep 1 may be a "coarse" sweep or iteration of the method 200. In the next sweep, stations 1 and/or 2 may refine the range of sectors in view of the previous iteration. For example, station 1 may use the results of the first sweep to calculate an approximate range in which the subsequent one or more sweeps should occur. In this manner, stations 1 and 2 may gradually develop efficient values for transmit and receive steering vectors. It will be also noted that iterative sweeping of the method 200 may be conducted in one timeslot or over a period spanning multiple timeslots.

FIG. 6 illustrates another method 250 for a joint bidirectional Tx and Rx sector sweeping. In state 252, station 2 may set its antenna array to an omni receive pattern mode $omni_{RX}$ in preparation for a Tx beamforming by sector sweeping procedure which station 1 initiates to determine the transmit steering vector $u_{TX}^1$. Station 1 may then transmit a sequence 256 of training data units which may be similar to the sequence 156 discussed above with reference to FIG. 4. The sequence 256 may include data units of equal size spaced apart at equal intervals and having an identifier such as a sequence number, and station 1 switches the steering vector u after transmitting each training data unit in the sequence 256. However, unlike the sequence 156, each training data unit in the sequence 256 may include an IE that identifies a request to initiate an Rx sweep procedure at station 1 and specifies a number of training data units to be transmitted during the procedure.

Next, station 1 may set its antenna array to an omni receive pattern mode in or immediately prior to state 258. In contrast to the embodiment discussed with reference to FIG. 4, station 2 may initiate a Tx sweep procedure by sending a sequence 262 of training data units (while iteratively switching the steering vector u) that include an IE specifying the feedback to the Tx sector sweeping procedure of station 1 (e.g., an identifier of a best received data unit), as well as an additional IE that indicates an Rx sector sweep request at station 2, possibly specifying a number of desired training data units in the requested Rx sector sweep procedure.

Upon processing the sequence 262, station 1 may respond to station 2 with a feedback message 266 carrying a feedback for the Tx sector sweeping procedure at station 2. Station 1 may also select and apply the transmit steering vector to its antenna array. Additionally, the feedback message 266 may include an IE indicating a confirmation to the Rx sweep request from station 2. The confirmation IE may specify the number of training data units station 1 is planning to send to station 2. It is contemplated that in most situations, the number in the confirmation IE would match the number in the data units sent in the sequence 262. In this manner, station 2 receives an explicit acknowledgement to the Rx sweep request, and can further rely on the feedback message 266 to synchronize the timing of subsequent Rx sector sweep training data units.

Station 2 may set its antenna array to the omni receive pattern mode after conducting the Tx sector sweeping procedure. Similarly, station 1 may apply the omni receive pattern mode to its antenna array upon transmitting the feedback message 266. Upon processing the feedback message 266, station 2 may reply with a similar feedback message 268 to synchronize with the Rx sweep request from station 1. However, it will be noted that messages 266 and 268 are optional.

In state 270, station 1 may apply the selected Tx transmit steering vector to its antenna array and transmit a series 274 of training data units Similar to the optional messages 266 and 268, stations 1 and 2 may exchange optional messages 276 and 278 to confirm the number of packets station 1 will send to station 2 (message 276) and acknowledge that station 1 is ready to receive training data units as a part of the Rx sector sweep procedure at station 1 (message 278). As indicated above, these optional messages allow stations 1 and 2 to synchronize in preparation for a sector sweeping procedure. It will be appreciated that this synchronization is particularly important when switching from a transmit mode to a receive mode, for example, is relatively time-consuming, or when there is a risk of a clock drift at station 1 or station 2. Further, if stations 1 and 2 do not use messages 266 and 268 or 276 and 278, the Tx/Rx and Rx/Tx turnaround times (i.e., the time it takes a station to switch between transmit and receive modes) may need to be fixed at both stations 1 and 2, as well as made known to the respective other station.

In another embodiment, the message 266 may additionally include an Rx sector sweep request from station 1. In this case, the message 268 may accordingly include a confirmation to the Rx sector sweep request, while the sequence 256 need not include an Rx sector sweep request. It is noted that this implementation will effectively reduce the number of data units that specify the Rx sector sweep request.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method for beamforming in a communication system, the method comprising:
    transmitting, with a first station, a first plurality of training data units via a first plurality of antennas to a second station having a second plurality of antennas, wherein
        the first plurality of training data units are transmitted while the second station operates the second plurality of antennas in an omni receive pattern mode, and
        each training data unit in the first plurality of training data units includes a corresponding first identifier;
    applying, at the first station, a different transmit steering vector as each training data unit in the first plurality of training data units is transmitted;
    after transmitting the first plurality of training data units, receiving, at the first station, a second plurality of training data units via the first plurality of antennas, the second plurality of training data units having been transmitted by the second station while the second station applies a different transmit steering vector to the second plurality of antennas as each training unit in the second plurality of training data units is transmitted, wherein the second plurality of training data units includes an information element that specifies a feedback from the second station, the feedback including one identifier corresponding to one of the training data units in the first plurality of data units;
    applying, at the first station, a single receive antenna configuration as all of the training data units in the second plurality of training data units are received;
    generating, at the first station, a first plurality of quality indicators based on the second plurality of received training data units, wherein each of the first plurality of quality indicators corresponds to a respective one of the second plurality of training data units;
    selecting, at the first station, one or more training data units from the second plurality of training data units based on the first plurality of quality indicators; and
    transmitting, from the first station to the second station, a feedback message including (i) one or more indicators of the one or more training data units selected from the second plurality of training data units, and (ii) a request to perform a subsequent beamforming training procedure to select a receive steering vector.

2. The method of claim 1, further comprising:
    after transmitting the feedback message, receiving, at the first station, a third plurality of training data units via the first plurality of antennas as part of the subsequent training procedure to select the receive steering vector, the third plurality of training data units having been transmitted by the second station while the second station applies a selected transmit steering vector to the second plurality of antennas;
    applying, at the first station, a different receive steering vector as each training data unit in the third plurality of training data units is received;
    generating, at the first station, a second plurality of quality indicators based on the third plurality of training data units, wherein each of the second plurality of quality indicators corresponds to a respective one of the third plurality of training data units; and
    selecting, at the first station, the receive steering vector based on the different receive steering vectors and the second plurality of quality indicators.

3. The method of claim 1, further comprising: transmitting, with the first station, a request to the second station, the request being for the first plurality of training data units to be transmitted.

4. The method of claim 1, wherein the second plurality of training data units are received at the first station in a time slot allocated by a network controller of the communication system.

5. The method of claim 1, wherein each pair of adjacent training data units in the second plurality of training data units are separated by a constant time interval.

6. An apparatus corresponding to a first station, the apparatus comprising:
    a beamforming network configured to be coupled to a first plurality of antennas;
    a beamforming controller configured to control the beamforming network to:
        (i) apply a different transmit steering vector as each training data unit in a first plurality of training data units is transmitted to a second station having a second plurality of antennas while the second station operates the second plurality of antennas in an omni receive pattern mode, wherein each training data unit in the first plurality of training data units includes a corresponding first identifier, and
        (ii) apply a single receive antenna configuration as all of the training data units in a second plurality of training data units are received via the first plurality of antennas after transmitting the first plurality of training data units, the second plurality of training data units having been transmitted by the second station while the second station applies a different transmit steering vector to the second plurality of antennas as each training unit in the second plurality of training data units is transmitted, wherein
            the second plurality of training data units includes an information element that specifies a feedback from the second station, the feedback including one identifier corresponding to one of the training data units in the first plurality of data units;
    a quality assessment unit configured to generate a first plurality of quality indicators based on the second plurality of received training data units, wherein each of the first plurality of quality indicators corresponds to a respective one of the second plurality of training data units; and
    a steering vector selection unit configured to select one or more training data units from the second plurality of training data units based on the first plurality of quality indicators, wherein the apparatus is configured to cause the first station to transmit a feedback message including (i) one or more indicators of the one or more training data units selected from the second plurality of training data units, and (ii) a request to perform a subsequent beamforming training procedure to select a receive steering vector.

7. The apparatus of claim 6, wherein:

the beamforming controller configured to control the beamforming network to apply a different receive steering vector as each training data unit in a third plurality of training data units is received via the first plurality of antennas as part of the subsequent training procedure to select the receive steering vector, the third plurality of training data units having been transmitted by the second station while the second station applies a selected transmit steering vector to the second plurality of antennas;

the quality assessment unit is configured to generate a second plurality of quality indicators based on the third plurality of training data units, wherein each of the second plurality of quality indicators corresponds to a respective one of the third plurality of training data units; and the steering vector selection unit configured to select the receive steering vector based on the different receive steering vectors and the second plurality of quality indicators.

8. The apparatus of claim 6, wherein the apparatus is configured to cause the first station to transmit a request to the second station, the request being for the first plurality of training data units to be transmitted.

9. The apparatus of claim 6, wherein the second plurality of training data units are received at the first station in a time slot allocated by a network controller of the communication system.

10. The apparatus of claim 6, wherein each pair of adjacent training data units in the second plurality of training data units are separated by a constant time interval.

11. A method for beamforming in a communication system, the method comprising:

receiving, at a first station, a first plurality of training data units via a first plurality of antennas, wherein
the first plurality of training data units have been transmitted by a second station while the second station applies a different transmit steering vector as each training data unit in the first plurality of training data units is transmitted, and
each training data unit in the first plurality of training data units includes a corresponding first identifier;

applying, at the first station, an omni receive pattern mode as all of the training data units in the first plurality of training data units are received;

generating, at the first station, a first plurality of quality indicators based on the first plurality of received training data units, wherein each of the first plurality of quality indicators corresponds to a respective one of the first plurality of training data units;

selecting, at the first station, one or more training data units from the first plurality of training data units based on the first plurality of quality indicators;

after receiving the first plurality of training data units, transmitting, from the first station, a second plurality of training data units via the first plurality of antennas, wherein the second plurality of training data units includes an information element that indicates the selected one or more training data units from the first plurality of training data units;

applying, at the first station, a different transmit steering vector as each training data unit in the second plurality of training data units is transmitted;

receiving, at the first station, a feedback message from the second station, the feedback message including (i) one or more indicators of the one or more training data units selected from the second plurality of training data units, and (ii) a request to perform a subsequent beamforming training procedure to select a receive steering vector for the second station; and selecting, at the first station, a transmit steering vector based on the feedback message.

12. The method of claim 11, further comprising:

after receiving the feedback message, transmitting, from the first station to the second station, a third plurality of training data units via the first plurality of antennas as part of the subsequent training procedure to select the receive steering vector; and applying, at the first station, the selected transmit steering vector as all of the training data units in the third plurality of training data units are transmitted.

13. The method of claim 11, further comprising: receiving, at the first station, a request from the second station, the request being for the first plurality of training data units to be transmitted.

14. The method of claim 11, wherein the second plurality of training data units are transmitted in a time slot allocated by a network controller of the communication system.

15. The method of claim 11, wherein each pair of adjacent training data units in the second plurality of training data units are separated by a constant time interval.

16. An apparatus corresponding to a first station, the apparatus comprising:

a beamforming network configured to be coupled to a first plurality of antennas;

a beamforming controller configured to control the beamforming network to:
(i) apply an omni receive pattern mode as all of the training data units in the first plurality of training data units are received via the first plurality of antennas, wherein
the first plurality of training data units have been transmitted by a second station while the second station applies a different transmit steering vector as each training data unit in the first plurality of training data units is transmitted, and
each training data unit in the first plurality of training data units includes a corresponding first identifier, and
(ii) apply a different transmit steering vector as each training data unit in a second plurality of training data units is transmitted via the first plurality of antennas, wherein the second plurality of training data units are transmitted after receiving the first plurality of training data units;

a quality assessment unit configured to for generate a first plurality of quality indicators based on the first plurality of received training data units, wherein each of the first plurality of quality indicators corresponds to a respective one of the first plurality of training data units; and a steering vector selection unit configured to:
(i) select one or more training data units from the first plurality of training data units based on the first plurality of quality indicators, wherein the second plurality of training data units includes an information element that indicates the selected one or more training data units from the first plurality of training data units, and (ii) select a transmit steering vector based on a feedback message received from the second station, the feedback message including (i) one or more indicators of the one or more training data units selected from the second plurality of training data units, and (ii) a request to perform a subsequent beamforming training procedure to select a receive steering vector for the second station.

17. The apparatus of claim 16, wherein the beamforming controller is configured to control the beamforming network to apply the selected transmit steering vector as all training data units in a third plurality of training data units are transmitted via the first plurality of antennas as part of the subsequent training procedure to select the receive steering vector for the second station.

18. The apparatus of claim 16, wherein the first plurality of training data unites are transmitted in response to receiving a request from the second station, the request being for the first plurality of training data units to be transmitted.

19. The apparatus of claim 16, wherein the second plurality of training data units are transmitted in a time slot allocated by a network controller of the communication system.

20. The apparatus of claim 16, wherein each pair of adjacent training data units in the second plurality of training data units are separated by a constant time interval.

\* \* \* \* \*